United States Patent [19]

Yavnai

[11] 4,016,719

[45] Apr. 12, 1977

[54] HYDROSTATIC TRANSMISSION SYSTEM

[75] Inventor: Amotz Yavnai, Kiriat Bialik, Israel

[73] Assignee: Technion Research and Development Foundation, Ltd., Haifa, Israel

[22] Filed: Mar. 30, 1976

[21] Appl. No.: 672,019

[30] Foreign Application Priority Data

Mar. 30, 1975  Israel .................................. 46964

[52] U.S. Cl. .................................. 60/416; 60/595; 91/4 R
[51] Int. Cl.² .......................................... F15B 1/02
[58] Field of Search ............ 60/369, 375, 416, 567, 60/581, 595; 91/4 R

[56] References Cited

UNITED STATES PATENTS

| | | | |
|---|---|---|---|
| 2,239,893 | 4/1941 | Jackman ........................... | 60/416 X |
| 3,073,108 | 1/1963 | Ward ................................. | 60/369 X |
| 3,100,965 | 8/1963 | Blackburn ......................... | 91/4 X |

*Primary Examiner*—Edgar W. Geoghegan
*Attorney, Agent, or Firm*—Browdy and Neimark

[57] ABSTRACT

An hydraulic power transmission circuit comprises a high-pressure section and a low-pressure section, which together include (a) an internal or external combustion free-piston engine to each of whose pistons is attached one piston pump, the pump piston and the engine piston being rigidly connected for the purpose of joint axial motion; (b) at least one rotary motor or linear actuator adapted to be driven by the hydraulic fluid pressurized by the said piston pumps; (c) valve means for directing the hydraulic fluid to and from the motors or actuators; (d) a charge pump; (e) accumulator means for balancing the fluctuations of pressure and quantity of the hydraulic fluid; and (f) means for controlling the operation of the free-piston engine, said means comprising a rotary auxiliary hydraulic motor of the positive displacement type in the low-pressure section of the circuit, which motor is provided with transmission means for driving a rotary distributor at a number of revolutions governed by the frequency of the free-piston engine.

6 Claims, 4 Drawing Figures

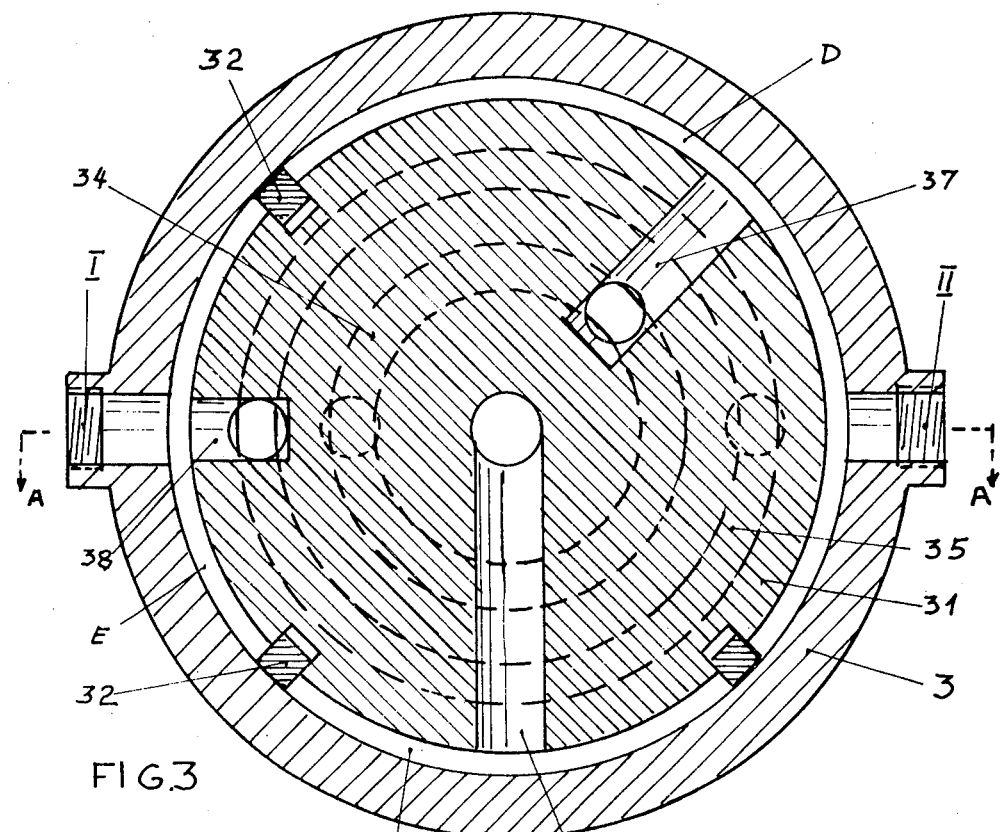
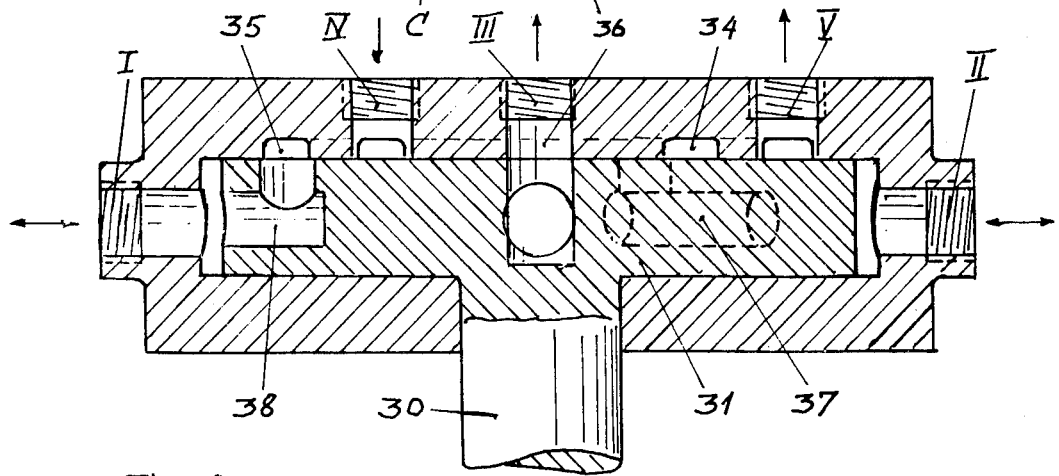

HYDROSTATIC TRANSMISSION SYSTEM

FIELD OF INVENTION

The invention relates to a hydrostatic transmission system and, more particularly, one comprising a free-piston engine coupled with a piston pump, a hydraulic positive displacement motor or linear actuator, and means for controlling the operation of the piston engine.

BACKGROUND

Hydraulic transmission of energy has lately been receiving increasing attention in the agricultural and construction equipment fields, because of its ease of operation and the possibility for its stepless change of torque and speed, especially where large forces are involved. This applies to such operations as lifting, digging, shoveling and the like, but this type of transmission is also extensively used in the propulsion of heavy vehicles, notably tracked vehicles, agricultural tractors, and earth-moving machinery.

Present methods of hydraulic transmissions comprise an engine-driven fixed or variable displacement pump and one or more fixed or variable displacement motors, interconnected by piping and valve means. The efficiency of these transmissions is relatively low on account of the friction losses incurred by the conversion of the reciprocating motion of the pistons into rotary motion by means of piston rods and crankshafts, and by the re-conversion of this rotary motion into reciprocating motion of the pump pistons through a swashplate or other means. The liquid pressure energy is eventually converted into mechanical energy by means of a linear actuator or a rotary motor, dependent on the kind and direction of movement required.

SUMMARY

It is an object of the present invention to overcome the deficiencies of the prior art, such as indicated above. It is another object to provide for improved hydraulic transmission of energy.

It is yet another object to simplify transmission equipment and thereby to improve its over-all efficiency, by providing a hydrostatic transmission system having a piston pump directly coupled to the piston of each cylinder of a reciprocating prime mover of the free-piston type, the number of pumps corresponding to the number of pistons.

It is a further object of the invention to provide such transmission system with a variable pumping capacity by changing the reciprocating frequency of the free-piston engine and the attached pump pistons.

The distributor is provided with suitably arranged ports for alternately connecting each pump cylinder in turn to the high-pressure section and to the low-pressure section of the hydraulic circuit in such an order that each pump is connected to the high-pressure section during at least part of its pumping stroke from the stroke's beginning, and to the low-pressure section during the entire length of its return stroke.

The auxiliary motor is so dimensioned as to rotate at a speed proportional to the engine frequency while receiving the total quantity of fluid returning to the pumps, through the low-pressure section. Furthermore, the auxiliary motor is adapted to drive other auxiliary devices such as a fuel injection pump or a spark-ignition mechanism, at a speed suitable for timing their operation with the speed of the prime mover engine piston to be served.

The hydraulic circuit may be a closed one, in which case the total quantity of hydraulic fluid pumped passes through the drive motor or motors and returns to the pump cylinders via the said auxiliary motor. On the other hand, it is advantageous, in many cases, to provide an open circuit, in which case only part of the hydraulic fluid is pumped through the drive motor or motors during the first part of the expansion stroke of the free-piston prime mover, and after having delivered its mechanical energy, is discharged from the motor into a collecting sump, from where it is pumped into the auxiliary motor inlet by a pump driven by the auxiliary motor.

During the second part of the expansion stroke the hydraulic fluid, delivered at lower pressure, is pumped directly to the inlet of the auxiliary motor, thus feeding to this motor the entire quantity of fluid delivered by the piston pumps.

The distributor for directing fluid from and to the various lines preferably consists of a rotor revolving, at a speed governed by the frequency of the free-piston engine in a cylindrical casing which is provided with suitable ports and fluid ducts as known to the art.

The different free pistons of one engine may be dynamically independent of each other, or they may be interconnected by a synchronizing mechanism known to the art.

BRIEF DESCRIPTION OF DRAWING

The accompanying drawings illustrate, by way of example, two embodiments of the invention, it being understood that these embodiments are merely exemplary and not limitative.

FIG. 3 is a schematic cross-section through the distributor used with the transmission system illustrated in FIG. 2, and FIG. 4 is a section along A—A of FIG. 3.

DETAILED DESCRIPTION OF EMBODIMENTS

Figure 1:
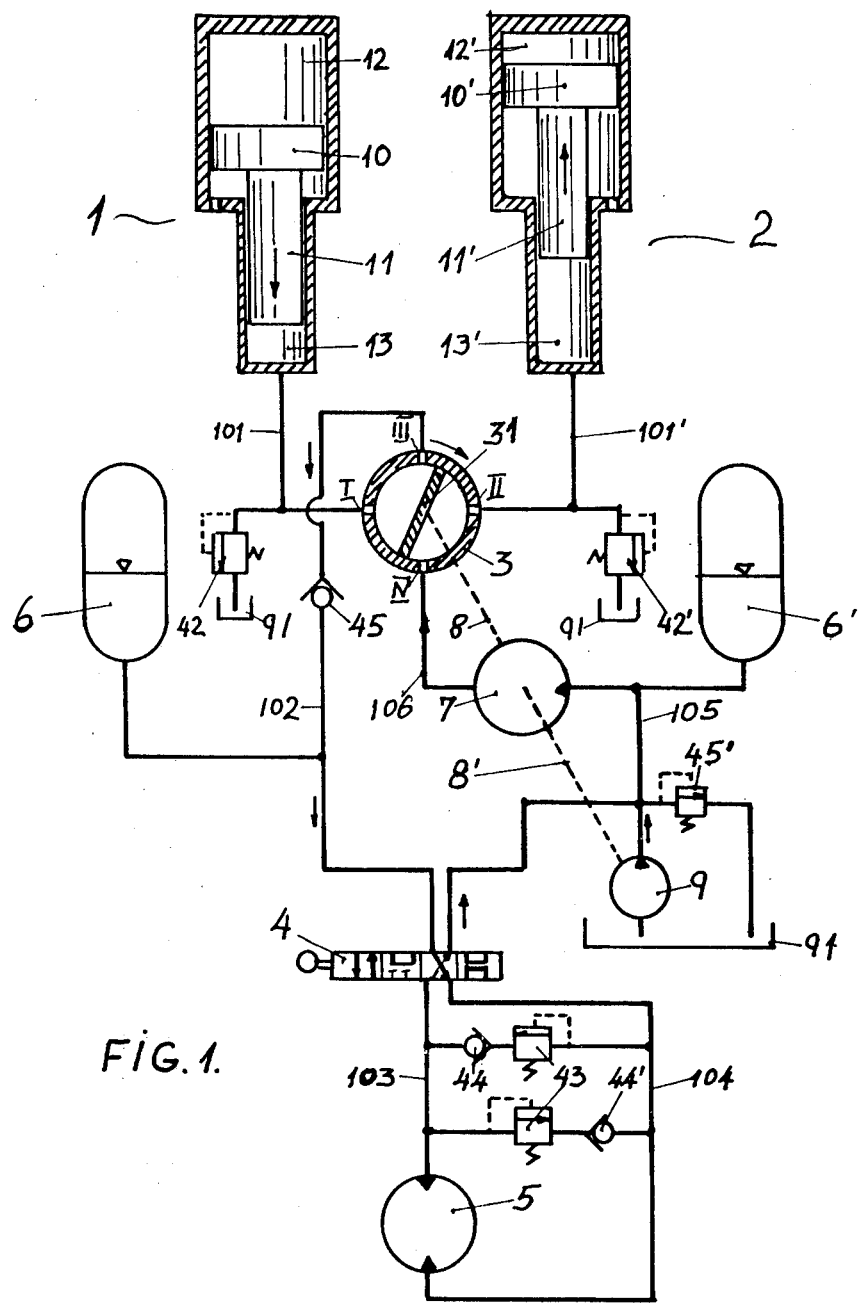
FIG. 1 is a diagrammatic representation of a closed-circuit hydrostatic transmission system.

With reference to FIG. 1 of the drawings, a prime mover is shown comprising two free-piston units 1 and 2 each containing a differential piston 10, 11 and 10', 11' arranged to reciprocate in a stepped cylinder casing 12, 13 and 12', 13'. The units 1 and 2 are single acting with the driving medium acting on the large-diameter piston 10 from above, and the engine may be any kind of prime-mover such as a steam engine, an internal combustion engine of the two-stroke or four-stroke type, an external combustion engine of the Stirling or other type, or the like. The annular space underneath the large piston 10 is preferably ventilated and remains unutilized, in contradistinction to the known system of opposed free-piston compressors, which return the piston after the expansion stroke. The return stroke of the differential piston is, contrary to conventional systems, obtained by fluid pressure from the low-pressure section acting on the pump piston.

The small-diameter piston 11 or 11' reciprocates in a corresponding cylinder 13 or 13' and serves to pump hydraulic fluid into the hydraulic system. The drawing being diagrammatic, no valves, vents, ignition means, fuel lines, etc. are shown in connection with either prime-mover or pump. The pistons of the two units 1 and 2 are timed to move in opposite directions, with the opposing ends of the respective strokes chronologically co-inciding. As exemplified by FIG. 1, the piston of unit 1 is near the end of its expansion stroke while that of unit 2 is near the end of the compression stroke.

The cylinders 13 and 13', of the units 1 and 2 respectively, are each connected by one pipe line, 101 and 101' respectively, to two opposedly situated ports I and II of a distributor casing 3, the rotor 31 of which is caused to make one revolution for each complete cycle of up-and-down strokes of the said two pistons by means of an auxiliary hydraulic displacement motor 7, the displacement of which equals the sum of the individual displacements of the said two small-diameter pistons and which is directly coupled or geared to the distributor rotor 31 (schematically illustrated by the broken line 8). Pressure relief valves 42 and 42' are provided in each of the two pipe lines 101 and 101', opening into a common sump 91, which is schematically shown to consist of three separate parts, but which in practice would normally constitute one unit.

The distributor 3 possesses two more ports positioned at right angles to the ports I and II, namely a high-pressure port III at the top (in FIG. 1) and a low-pressure port IV at the bottom of the distributor casing 3. The high-pressure port III is connected by a high-pressure line 102 via a check valve 45 to a control valve 4 of known design, by means of which a hydraulic motor (or linear actuator) 5 can be controlled. FIG. 1 shows the control valve 4 in the "reverse" position, its other positions — from left to right — being "forward," "stop" and "free wheel". The two pipes 103 and 104 connecting the hydraulic motor 5 to the control valve 4 are interconnected by two check valves 44 and 44' and by two pressure relief valves 43 and 43' acting in opposite directions and serving to reduce sudden pressure surges. An accumulator 6 of known design is connected to line 102 and serves to balance flow and pressure variations between the distributor 3 and the control valve 4.

A low-pressure line 105 leads from the control valve 4 to the auxiliary motor 7 and then via line 106 to the low-pressure port IV of the distributor casing 3. The auxiliary motor 7 also drives a hydraulic pump 9, by means of a second drive transmission 8', the suction side of which pump 9 is connected to the common sump 91, its pressure side to the low-pressure line 105. The purpose of the pump 9 is to replace excess-pressure spill and fluid leaks in the distributor 3, the control valve 4, and the drive motor 5.

An accumulator 6' and a pressure relief valve 45' are connected to line 105 in order to balance flow and pressure variations.

The above-described transmission system is dependent on the correct dimensioning of the auxiliary motor 7 which drives the rotor 31 of the distributor 3 at the frequency of the free-piston engine. FIG. 1 shows the piston of unit 1 nearing the end of its downstroke and the distributor vane 31 — moving in the counterclockwise direction — shortly before reaching the ports III and IV. In this position the hydraulic fluid is delivered out of the pump cylinder 13 through the distributor 3 to the control valve 4 and to the hydraulic motor (or linear actuator) 5. The depressurized fluid returns to, and drives, the auxiliary motor 7 and thence enters the port IV of the distributor, where the vane 31 directs it to the cylinder 13' of the second pump unit. There it acts on the piston and drives it upward compressing the gas in the engine cylinder 12'.

The moment the pistons have reached the respective upper and lower ends of the strokes, the rotor vane 31 changes the relative connection between the ports of the distributor, the unit 2 starts its expansion stroke, and unit 1 starts its compression stroke. The pressurized fluid is now directed from cylinder 13' into the pressure line 102 and the low-pressure side is connected to unit 1, thus continuing the operation of the drive motor or actuator 5. Actuation of valves, injectors or spark ignition equipment is likewise obtained by the rotation of the auxiliary motor 7 in a manner known per se.

It is obvious that the returning fluid must be maintained at a pressure sufficient for driving the pistons during the compression stroke, i.e. only part of the energy given off during the expansion stroke can be utilized in the drive motor 5. This is, mutatis mutandis, the case with the energy balance of crankshaft engines; the flywheel serves to accumulate the energy necessary for driving auxiliaries and for returning the pistons during the compression stroke.

Figure 2:
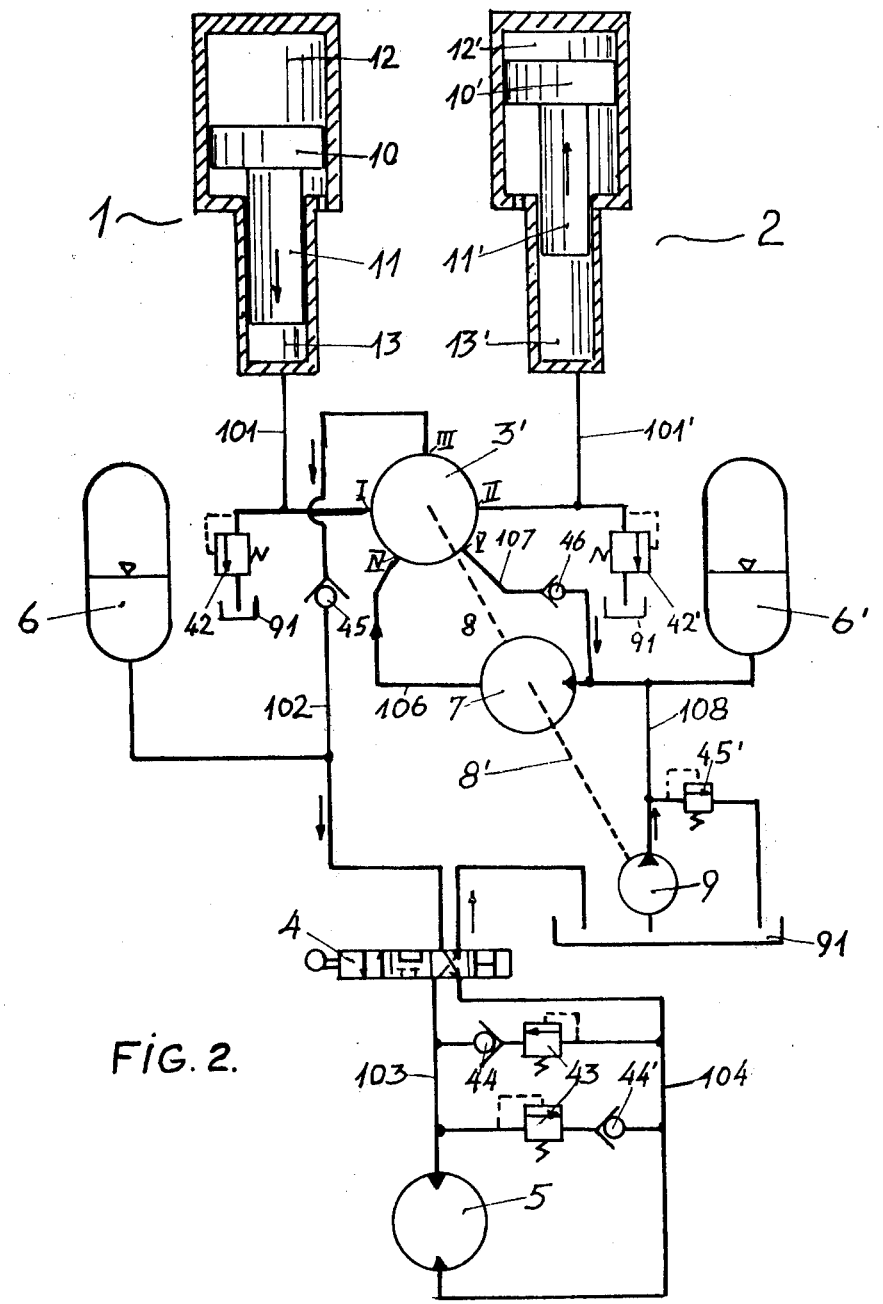
FIG. 2 is a diagrammatic representation of an open-circuit hydrostatic transmission system.

The open-circuit system shown in FIG. 2 obviates some of the problems arising from the need for balancing the pressures in the high- and low-pressure sections of the system shown in FIG. 1. In the open-circuit system the output from the piston pumps is alternately directed to the drive motor 5 and to the auxiliary motor 7 in such a way that the high-pressure output of the engine, which arises during the first part of the expansion stroke, is directed to the drive motor 5, while the lower pressure prevailing near the end of the stroke is directed to the auxiliary motor 7. This system of FIG. 2 is in some of its parts similar to the system shown in FIG. 1, and accordingly the same reference numerals are used to designate identical parts. It differs mainly in that the hydraulic fluid leaving the drive motor 5 is directed to the return port of the auxiliary motor 7 via the common open sump 91, and that the distributor 3' is equipped with five ports rather than four ports as the distributor 3 in the closed-circuit system of FIG. 1. The delivery from the two pumps into the two ports I and II is identical in the two systems; so is the high-pressure line 102 leading from port III of the distributor to control valve 4. Also, the fluid circuits between the control valve 4 and the drive motor 5 are identical in both cases.

However, the fluid returned from the motor 5 in the open-circuit system of FIG. 2 is spilled into the common sump 91 and is then pumped by the pump 9 into the auxiliary motor 7 through the line 108. The capacity of the pump 9 in FIG. 2 is greater than that of pump 9 in the closed circuit system of FIG. 1, since it must pump the total volume of hydraulic fluid passing through the drive motor 5, while the former serves to replace leakage only. The auxiliary motor 7 receives fluid from two sources: one such source is pump 9, the balance of the fluid being supplied direct from the piston pumps 13 and 13' during the latter part of their respective downward strokes, by action of the distributor 3' which directs the fluid, through its additional port V, a check valve 46, and a line 107, into the line connecting the pump 9 to the auxiliary motor 7.

On the positioning of port V depend the division of the pump piston's expansion stroke into drive and auxiliary portions.

The total quantity of fluid leaving the auxiliary motor 7 enters the distributor through port IV: as previously noted, this quantity, during each revolution of the distributor rotor is equal to the quantity displaced by all the piston pumps together.

FIGS. 3 and 4 show the distributor employed with the system illustrated in FIG. 2. It consists of a cylindrical casing 3 and a rotor 31 driven by a shaft 30. The casing possesses five ports for connection to the different lines shown in FIG. 2: — Ports Nos. I and II are connected to the pump cylinders of the free-piston units 1 and 2 respectively; No. III is connected to the high-pressure line 102; No. IV is connected to the outlet of the auxiliary motor 7, and No. V is connected to the inlet of the auxiliary motor. As indicated by the arrows, hydraulic fluid flows through ports I and II in either direction dependent on the piston movement of the free-piston-engine; high-pressure fluid leaves through port III; low-pressure fluid leaves through port V; while low-pressure fluid enters through port IV.

The rotor 31 is in the shape of a disc having a diameter smaller than the internal diameter of the casing and at three points of its circumference is provided with three sliding seals or vanes 32 which are sealingly pressed against the internal wall of the cylindrical casing 3 by centrifugal force, thus forming three unequal compartments C, D and E together making up a complete annulus.

Three radially extending ducts 36, 37 and 38 are drilled or otherwise provided to different depths toward the axis of the distributor rotor 31, their precise positions and purpose becoming clear from the subsequent description. In addition, two circulars, concentric channels 34 and 35 are provided on or facing one flat surface of the rotor 31. The sides or flat surfaces of the rotor 31 are tightly enclosed by the casing 3 in order to prevent fluid leakage as far as possible. It is opportunely pointed out that the drawing of the distributor is schematic only, and no provisions are shown for the insertion of the rotor, its sealing, its connection to the shaft and other technical details, so as not to obscure the essential features.

The two ports I and II are positioned in directly opposite locations spaced 180° on the circumference of the casing 3, and they are open towards the circumferential compartments. The ports III, IV and V, on the other hand, are inserted in the front or top side of the casing 3, opposite the shaft side. Port III is located exactly in the center, on the axis of the distributor rotor shaft 30, while ports IV and V are off-center, each opening into one annular groove, respectively 34 and 35, cut concentrically facing the rotor 31 into the flat inside wall of the casing 3. Each groove, as well as the central port III, is connected to one of the circumferential compartments by the fluid ducts drilled radially into the rotor 31; thus port III is connected, via the duct 36, to the compartment marked C on FIG. 3, port IV is connected through the annular groove 34 and duct 37 to the compartment marked D, and port V is connected through the annular groove 35 and via the duct 38 to the compartment marked E.

In the position of the rotor shown in the drawing, port I is connected to port V, and port II to port IV, while port III is blocked. This situation corresponds to the position of the engine pistons shown in FIG. 2 of the drawings. The piston of unit 1 is nearing the lower end of its stroke, when the engine pressure is low and, therefore, the hydraulic fluid is pumped directly into the inlet side of the auxiliary motor 7. The piston of unit 2, driven by fluid entering the cylinder from the auxiliary motor outlet through ports IV and II, is near the top of its stroke. Since high pressure fluid is not available at the moment depicted, the high-pressure line 102 is fed fluid from the accumulator 6, which drives the motor 5 via the control valve 4. It can be seen that compartment D occupies about one half of the circumference, thereby assuring return of low-pressure fluid to each of the pump cylinders during an entire upward stroke of the piston. The other two compartments, C and E, occupy about one quarter of the circumference each, with the result that hydraulic fluid leaving the pump cylinder at high pressure is directed to the high pressure line during the upper half of the stroke, while during the other half of the stroke hydraulic liquid is fed to the auxiliary motor 7 at low pressure. Dependent on the type of engine and its displacement-pressure diagram, the relative size of the two compartments may be changed to direct more or less high-pressure fluid to the control valve 4.

When more than two free-piston units form together one engine, the distributor 3 will be modified to have a corresponding number of ports and connections to the pumps evenly distributed over its circumference, while the other connections may remain as in the present exemplification. It is obvious that more cylinders will provide a more balanced flow output than the two cylinders illustrated and described in the foregoing example, which has been chosen for the sake of simplicity.

With reference to the distributor illustrated in FIGS. 3 and 4, three cylinders can be connected by spacing three ports at 120° along the casing periphery and connecting them to such three cylinders. For a unit with four cylinders these can either be connected to four ports evenly spaced at 90° along the casing periphery, or to a distributor having a dual rotor with two ports each. Similarly the distributor illustrated in FIG. 1 can be adapted to four cylinders by providing two vane rotors with staggered ports.

It will be obvious to those skilled in the art that various changes may be made without departing from the scope of the invention and the invention is not to be considered limited to what is shown in the drawings and described in the specification.

What is claimed is:

1. A hydrostatic transmission system comprising a hydraulic circuit consisting of a high-pressure section and a low-pressure section, which together include a free-piston engine having at least two cylinders each having one engine piston to which is connected a pump piston, said engine piston being rigidly connected to said pump piston for the purpose of joint axial motion;
   at least one rotary motor or linear actuator adapted to be driven by the hydraulic fluid pressurized by said piston pumps;
   valve means for directing the hydraulic fluid to and from said motor or actuator;
   means for controlling the operation of said free-piston engine, said controlling means comprising a rotary distributor and a rotary, auxiliary hydraulic motor of the positive displacement type in the low-pressure section of the circuit, said auxiliary hydraulic motor being provided with transmission means for driving said rotary distributor at the number of revolutions governed by the frequency of said free-piston engine, said rotary distributor being provided with ports for alternately connecting each pump cylinder in turn to the high-pressure section and to the low-pressure section of the hydraulic circuit in such an order that each pump is connected to the high-pressure section during at least part of its pumping stroke from the stroke's beginning, and to the low pressure section during the entire length of its return stroke.

2. A hydrostatic transmission system as claimed in claim 1, wherein said auxiliary motor is so dimensioned as to rotate at a speed proportional to the engine frequency while receiving the entire quantity of fluid returned to the pumps, through the low-pressure section.

3. A hydrostatic transmission system as claimed in claim 1, wherein said auxiliary motor is also adapted to drive auxiliary equipment such as a fuel injection pump or a spark-ignition mechanism, at a speed suitable for timing their operation with the speed of the prime engine piston to be served.

4. A hydraulic transmission system as claimed in claim 1 wherein the high-pressure section and the low-pressure section are connected to form a closed circuit arranged for the entire quantity of the hydraulic fluid to pass through the high-pressure section to the drive motors or actuator and then through the low-pressure section and said auxiliary motor back to the pump cylinders.

5. A hydraulic transmission system as claimed in claim 1 wherein the high-pressure section and the low-pressure section form an open circuit, wherein the distributor ports are adapted to deliver hydraulic fluid to the drive motor or actuator only during the first part of the expansion stroke of the free-piston engine, and to the auxiliary motor during the second part of the expansion stroke, while duct means are provided for guiding the fluid discharged from the drive motor or actuator into an open sump, a charge pump to be driven by the auxiliary motor being provided to deliver the hydraulic fluid from said pump to the auxiliary motor.

6. A system in accordance with claim 1 further comprising accumulator means for balancing the fluctuations of pressure and quantity of the hydraulic fluid, said accumulator means being located between said controlling means and said valve means.

* * * * *